(12) United States Patent
Chun et al.

(10) Patent No.: US 9,627,958 B2
(45) Date of Patent: Apr. 18, 2017

(54) METHOD AND CIRCUIT FOR CHANGING CAPACITANCE VALUE OF OUTPUT CAPACITOR OF POWER FACTOR CORRECTOR

(71) Applicant: HYUNDAI MOTOR COMPANY, Seoul (KR)

(72) Inventors: Ho Tae Chun, Hwaseong-si (KR); Chang Han Jun, Uijeongbu-si (KR); Jeong Yun Lee, Hwaseong-si (KR); Seung Hyun Han, Yongin-si (KR); Jin Young Yang, Hanam-si (KR); Woo Young Lee, Cheongju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 181 days.

(21) Appl. No.: 14/558,698

(22) Filed: Dec. 2, 2014

(65) Prior Publication Data

US 2015/0180272 A1 Jun. 25, 2015

(30) Foreign Application Priority Data

Dec. 24, 2013 (KR) .................. 10-2013-0162142

(51) Int. Cl.
*H02J 7/00* (2006.01)
*H02M 1/42* (2007.01)
*B60L 11/18* (2006.01)
*G06F 1/30* (2006.01)

(52) U.S. Cl.
CPC ....... *H02M 1/4208* (2013.01); *B60L 11/1811* (2013.01); *G06F 1/30* (2013.01); *B60L 2210/14* (2013.01); *Y02T 10/7005* (2013.01); *Y02T 10/7072* (2013.01); *Y02T 10/7225* (2013.01); *Y02T 90/127* (2013.01); *Y02T 90/14* (2013.01)

(58) Field of Classification Search
CPC ....................................... H02J 7/045
USPC ............................................ 320/137
See application file for complete search history.

(56) References Cited

U.S. PATENT DOCUMENTS

| | | | | |
|---|---|---|---|---|
| 4,222,096 A | * | 9/1980 | Capewell | H02M 1/4208 363/126 |
| 5,515,261 A | * | 5/1996 | Bogdan | H02M 1/4225 323/222 |
| 5,565,761 A | * | 10/1996 | Hwang | H02M 1/4208 323/222 |
| 5,973,547 A | | 10/1999 | Ang et al. | |

(Continued)

FOREIGN PATENT DOCUMENTS

| | | |
|---|---|---|
| JP | 1992-069021 A | 4/1992 |
| JP | 2002-125303 A | 4/2002 |

(Continued)

*Primary Examiner* — M'Baye Diao
(74) *Attorney, Agent, or Firm* — McDermott Will & Emery LLP

(57) ABSTRACT

A method for changing a capacitance value of an output capacitor of a power factor corrector (PFC) includes applying AC power to a power conversion circuit. It is sensed whether an instantaneous power failure occurs in the AC power. Output capacitors of the PFC of the power conversion circuit are connected in parallel to each other to increase capacitance values of the output capacitors, when it is sensed that the instantaneous power failure does not occur in the AC power.

4 Claims, 6 Drawing Sheets

(56) References Cited

U.S. PATENT DOCUMENTS

| | | | |
|---|---|---|---|
| 6,359,426 B1* | 3/2002 | Sarles | H02M 1/4208 323/281 |
| 6,538,906 B1* | 3/2003 | Ke | H02M 3/33569 323/288 |
| 6,650,554 B2* | 11/2003 | Darshan | H02H 9/001 323/207 |
| 7,638,966 B1* | 12/2009 | Pummer | G05F 1/70 318/438 |
| 7,907,429 B2* | 3/2011 | Ramadass | H02M 3/07 307/110 |
| 7,948,301 B2* | 5/2011 | Cook | H02M 3/07 327/536 |
| 8,031,500 B2* | 10/2011 | Wang | H02M 1/4208 363/127 |
| 2004/0135622 A1 | 7/2004 | Masleid et al. | |
| 2006/0203413 A1 | 9/2006 | Peron et al. | |
| 2012/0230060 A1 | 9/2012 | Tanaka et al. | |

FOREIGN PATENT DOCUMENTS

| | | |
|---|---|---|
| JP | 2007-053853 A | 3/2007 |
| KR | 10-2003-0088860 A | 11/2003 |
| KR | 10-2012-0102308 A | 9/2012 |
| KR | 10-2012-0127802 A | 11/2012 |
| KR | 10-2013-0087748 A | 8/2013 |

* cited by examiner

METHOD AND CIRCUIT FOR CHANGING CAPACITANCE VALUE OF OUTPUT CAPACITOR OF POWER FACTOR CORRECTOR

CROSS-REFERENCE TO RELATED APPLICATION

This application is based on and claims benefit of priority to Korean Patent Application No. 10-2013-0162142 filed Dec. 24, 2013, the entire content of which is incorporated herein by reference.

TECHNICAL FIELD

The present inventive concept relates to a method and circuit for changing a capacitance value of an output capacitor of a power factor corrector. More particularly, the present inventive concept relates to a circuit structure in which the connection structure between output capacitors is changed thereby reducing ripples of an output voltage while increasing hold-up time.

BACKGROUND

A power supply using a general switching converter requires a rectifying circuit for rectifying AC input power into DC power. In addition, a smoothing capacitor having a large capacitance value is used in the rectifying circuit so as to reduce a burden on a switching element by compensating instantaneous power failure or reducing ripples of input power. Securing hold-up time is another major factor for determining the capacitance of the capacitor. As shown in FIG. 2, the hold-up time refers to an amount of time for which an output voltage maintains a prescribed voltage range after an input is cut off.

Thus, when a capacitor having large capacitance is used as an output capacitor of a power factor corrector (PFC) used in a vehicle, ripples can be reduced, thereby supplying stable power. However, the size of an onboard battery charger is limited due to its space, and accordingly, there is a limitation on increasing capacitance.

Therefore, a capacitor having capacitance which can satisfy the hold-up time is usually selected. However, in a conventional PFC, there is a problem in that a capacitor having a capacitance value greater than that required is selected for improved hold-up time and reduced ripples.

FIG. 1 is a circuit diagram illustrating a circuit configuration of a conventional onboard battery charger.

The conventional onboard battery charger may include an AC power source 10, a PFC circuit 20, a phase shift full bridge 30, an output terminal inductor 40, an output terminal capacitor 50, a battery 60, and the like.

In the conventional onboard battery charger, the phase shift full bridge 30 may include a switch circuit 31, a transformer 32 and an output terminal diode 33. The PFC circuit 20, which may be referred to as a power factor improving circuit, may be configured to include an inductor 21, a switching element 22, a diode 23 and an output capacitor 24.

As shown in FIG. 1, the output capacitor 24 of the conventional PFC circuit 20 is simply connected to an output terminal of the PFC circuit 20, and therefore, the capacitance value of the output capacitor 24 cannot be controlled by changing the structure of the PFC circuit 20. That is, the voltage applied to both ends of the output capacitor 24 cannot be controlled in an instantaneous power failure of the AC power source 10, and a capacitor having a large capacitance value should be selected as the output capacitor 24 in order to maintain long hold-up time.

However, the output capacitor 24 having a simply large capacitance value increases the size of the onboard battery charger and reduces the output density, i.e., power density calculated by dividing a power by a volume, of the onboard battery charger. Further, the output capacitor 24 may cause a problem in the configuration of a high-voltage charge system package.

SUMMARY

The present inventive concept provides a method for changing a capacitance value of an output capacitor of a power factor corrector (PFC), in which the connection structure of capacitors of the PFC is changed, thereby reducing ripples using a capacitor having a large capacitance value in a normal operation of an onboard battery charger, while instantaneously increasing the voltage between both terminals of the capacitor, thereby securing sufficient hold-up time.

One aspect of the present inventive concept relates to a method for changing a capacitance value of an output capacitor of a PFC, including applying AC power to a power conversion circuit. It is sensed whether an instantaneous power failure occurs in the AC power. Output capacitors of the PFC of the power conversion circuit are connected in parallel to each other to increase capacitance values of the output capacitors, when it is sensed that the instantaneous power failure does not occur in the AC power.

The power conversion circuit may be an onboard battery charger circuit of a vehicle.

Another aspect of the present inventive concept encompasses a method for changing a capacitance value of an output capacitor of a PFC, including applying AC power to a power conversion circuit. It is sensed whether an instantaneous power failure occurs in the AC power. Output capacitors of the PFC of the power conversion circuit are connected in series to each other to decrease capacitance values of the output capacitors, when it is sensed that the instantaneous power failure occurs in the AC power.

The power conversion circuit may be an onboard battery charger circuit of a vehicle.

Still another aspect of the present inventive concept relates to a circuit for changing a capacitance value of an output capacitor of a PFC, including a first capacitor, a second capacitor, a first switch, a second switch, and a third switch. The first capacitor is provided at an output terminal of the PFC and has a first terminal and a second terminal. The second capacitor has a first terminal and a second terminal. The first switch has one terminal connected to the first terminal of the first capacitor and another terminal connected to the first terminal of the second capacitor. The second switch has one terminal connected to the first terminal of the first capacitor and another terminal connected to the second terminal of the second capacitor. The third switch has one terminal connected to the second terminal of the second capacitor and another terminal connected to the second terminal of the first capacitor.

The circuit may further include an instantaneous power failure sensor 70 configured to sense whether an instantaneous power failure occurs in AC power applied to the PFC, and a controller 80 configured to control open and close operations of the first, second or third switch, based on a result of the sensing whether the instantaneous power failure occurs in the AC power, by the instantaneous power failure sensor 70.

When the instantaneous power failure sensor 70 senses that the instantaneous power failure does not occur in the AC power, the controller 80 may be configured to close the first switch, open the second switch, and close the third switch.

When the instantaneous power failure sensor 70 senses that the instantaneous power failure occurs in the AC power, the controller 80 may be configured to open the first switch, close the second switch, and open the third switch.

As described above, the method for changing the capacitance value of the output capacitor of the PFC according to the present inventive concept has the following advantages.

First, the two capacitors may be connected in parallel to each other in a normal operation of the onboard battery charger, thereby increasing capacitance values of the capacitors. Thus, it is possible to increase the capacitance values of the capacitors in the normal operation of the onboard battery charger, thereby reducing ripples of an output voltage.

Second, when a sudden voltage drop occurs in the AC power source, the connection between the two capacitors may be changed into a serial connection, so that the voltage applied to the capacitor can be instantaneously increased. Thus, it is possible to increase the hold-up time.

Third, the connection between the capacitors may be changed into a parallel or serial connection, so that it is possible to minimize the capacitance values of the capacitors and to improve the output density of the onboard battery charger.

The above and other features of the inventive concept are discussed infra.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept.

Figure 1:
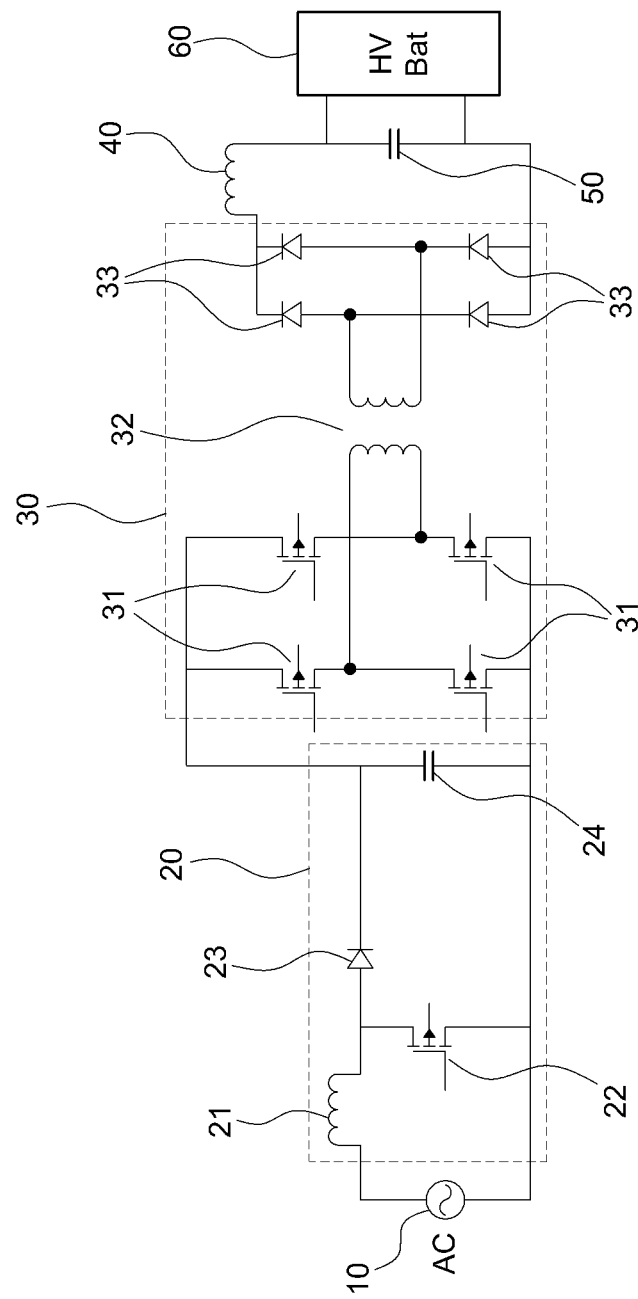
FIG. 1 is a circuit diagram illustrating a circuit configuration of a conventional onboard battery charger.
Figure 2:
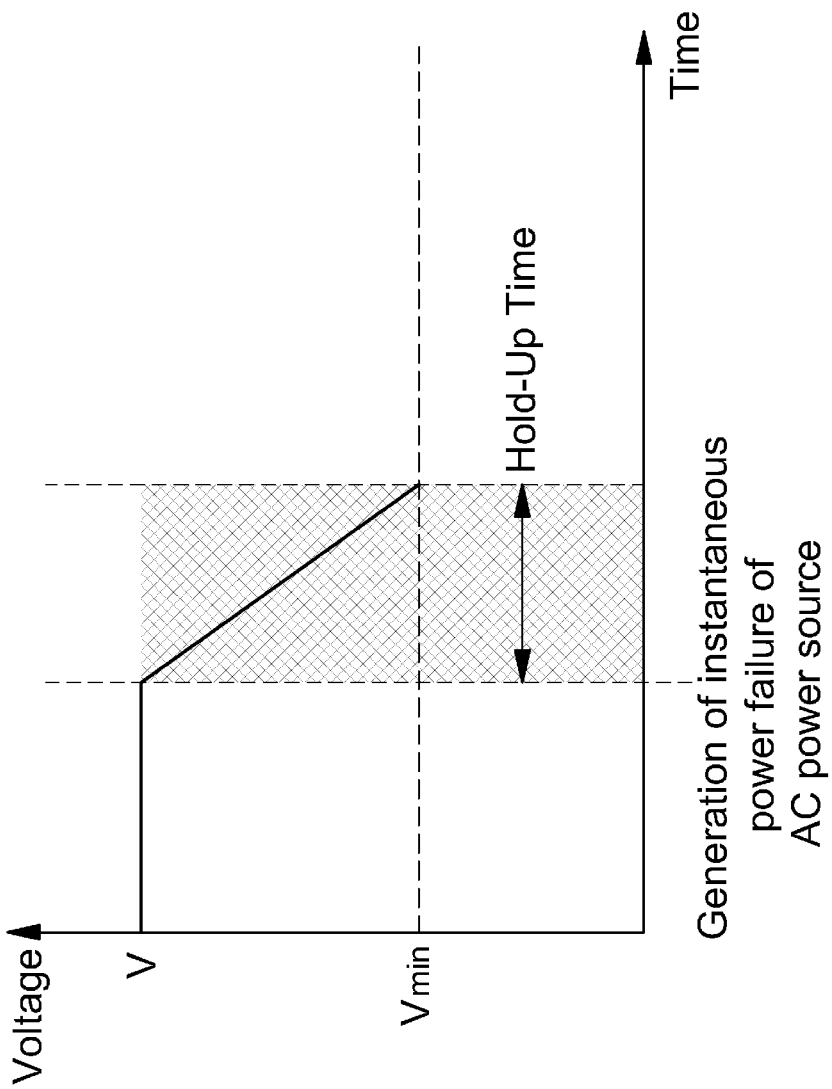
FIG. 2 is a graph illustrating a hold up time.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

An onboard battery charger that may include an AC-DC converter for charging a high-voltage battery of a plug-in hybrid vehicle or electric vehicle is a very important device which supplies power necessary for the hybrid vehicle or electric vehicle.

The onboard battery charger may be provided with a power factor corrector (PFC) in order to power factor. A high-capacity output power capacitor may be provided at an output terminal of the PFC in order to absorb current ripples and to secure hold-up time in an instantaneous power failure.

As described above, the hold-up time refers to an amount of time for which the output of the onboard battery charger can be maintained even in an instantaneous power failure of AC power, using energy stored in an output capacitor.

Figure 3:
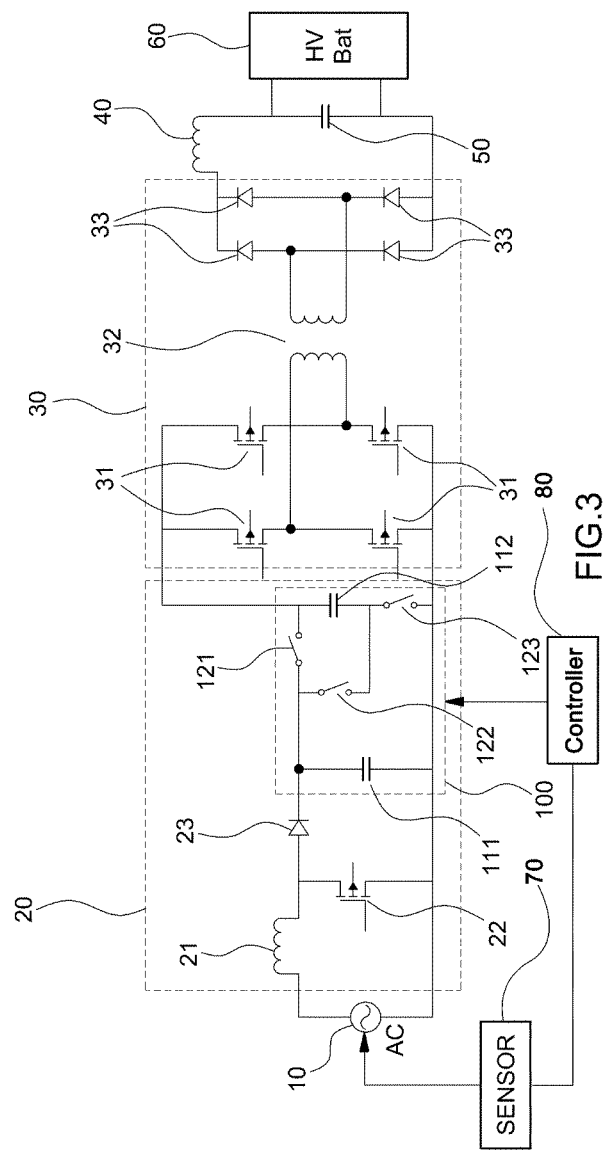
FIG. 3 is a circuit diagram illustrating a state in which a circuit for changing a capacitance value of an output capacitor of a power factor corrector (PFC) is applied according to an embodiment of the present inventive concept.

FIG. 3 is a circuit diagram illustrating a state in which a circuit for changing a capacitance value of an output capacitor of a PFC is applied according to an embodiment of the present inventive concept.

Referring to FIG. 3, a PCF circuit 20 mounted in a circuit of an onboard battery charger may be identical to the PCF circuit 20 of FIG. 1 except the circuit structure of an output terminal capacitor.

In the circuit according to an embodiment of the present inventive concept, the capacitance value of an output capacitor of the PFC circuit 20 can be changed by operating capacitors provided at an output terminal of the PFC circuit 20 and switches for changing the connection structure between the capacitors.

To this end, the circuit 100 according to an embodiment of the present inventive concept may include a first capacitor 111, a second capacitor 112, a first switch 121, a second switch 122 and a third switch 123.

The first and second capacitors 111 and 112 according to an embodiment of the present inventive concept may have a structure in which the first and second capacitors 111 and 112 are connected in parallel. More specifically, the first and second capacitors 111 and 112 may have ground terminals connected to a ground and have output terminals opposite to the ground terminals. The first switch 121 may be provided between the output terminals of the first and second capacitors 111 and 112. The second capacitor 112 may be connected to the ground through the third switch 123. One terminal of the second switch 122 may be connected to the output terminal of the first capacitor 111, and the other terminal of the second switch 122 may be connected to a connection point at which the second capacitor 112 and the third switch 123 are connected to each other.

The circuit according to an embodiment of the present inventive concept may control the connection between the first and second capacitors 111 and 112 to become a parallel or serial connection by performing the open and close operations of the first to third switches. Accordingly, it is possible to control a total capacitance value.

The circuit according to an embodiment of the present inventive concept may further comprise an instantaneous power failure sensor 70 configured to sense whether an instantaneous power failure occurs in AC power applied to the PFC. A controller 80 is configured to control open and close operations of the first, second, or third switch based on a result of the sensing whether the instantaneous power failure occurs in the AC power.

When the instantaneous power failure sensor 70 senses that the instantaneous power failure does not occur in the AC power, the controller 80 closes the first switch, open the second switch, and close the third switch. On the other hand, when the instantaneous power failure sensor 70 senses that the instantaneous power failure occurs in the AC power, the controller 80 opens the first switch, closes the second switch, and opens the third switch.

Figure 4:
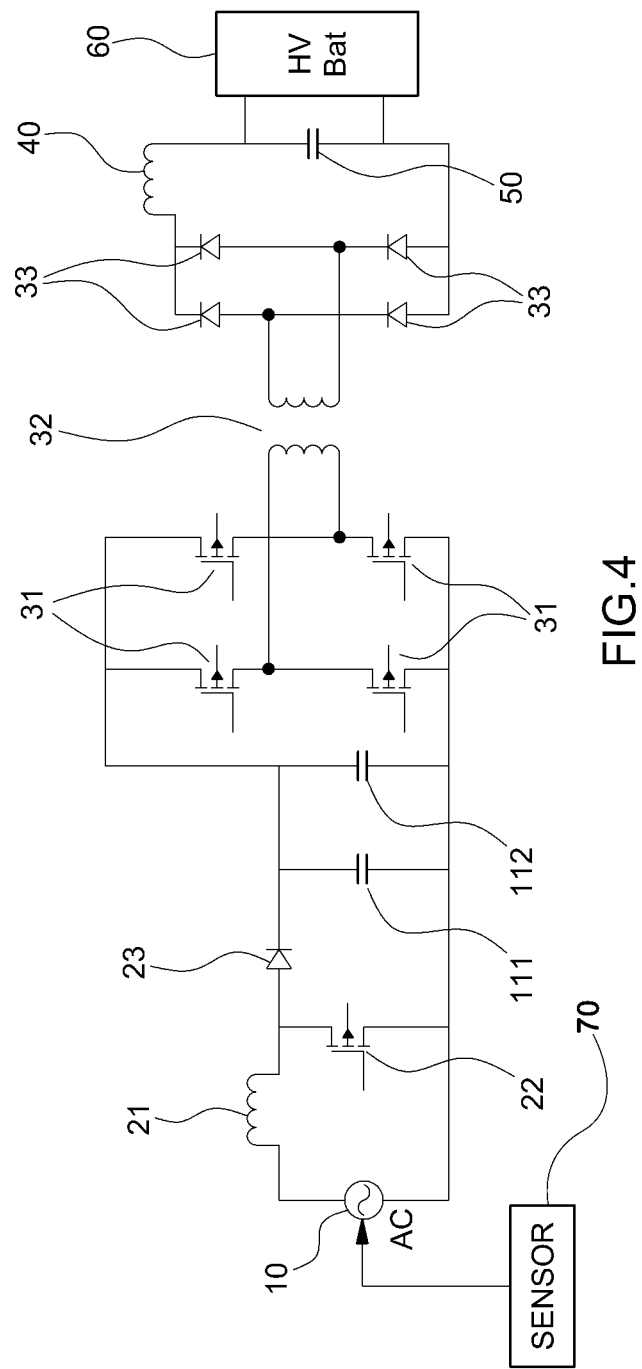
FIG. 4 is a circuit diagram illustrating a case where the output capacitor is connected in parallel in a method for changing a capacitance value of the output capacitor of the PFC according to an embodiment of the present inventive concept.

FIG. 4 is a circuit diagram illustrating a case where the output capacitor is connected in parallel in a method for changing a capacitance value of the output capacitor of the PFC according to an embodiment of the present inventive concept.

In the method according to an embodiment of the present inventive concept, in order to connect the first and second capacitors 111 and 112 in parallel to each other, the first switch 121 may be closed, the second switch 122 may be opened, and the third switch 123 may be closed so that the circuit diagram in FIG. 3 may become equivalent to the circuit diagram in FIG. 4.

Thus, in the method according to an embodiment of the present inventive concept, when the onboard battery charger is normally operated, the first and second capacitors 111 and 112 may be connected in parallel to each other (see FIG. 4), so that the total capacitance value of the capacitors are increased, thereby minimizing ripples generated in an output of the PFC circuit 20.

Figure 5:
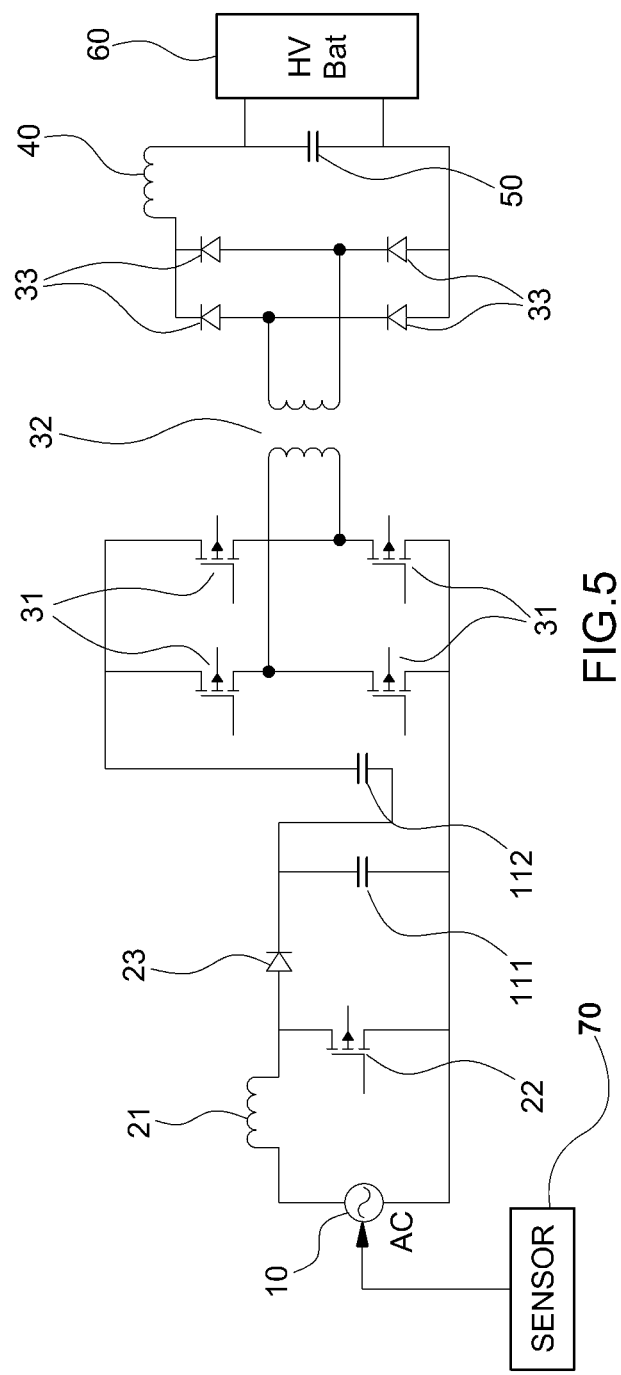
FIG. 5 is a circuit diagram illustrating a case where an output capacitor is connected in series in a method for changing the capacitance value of the output capacitor of the PFC according to an embodiment of the present inventive concept.

FIG. 5 is a circuit diagram illustrating a case where an output capacitor is connected in series in the method for changing the capacitance value of the output capacitor of the PFC according to an embodiment of the present inventive concept.

In the method according to an embodiment of the present inventive concept, in order to connect the first and second capacitors 111 and 112 in series to each other, the first switch 121 may be opened, the second switch 122 may be closed, and the third switch 123 may be opened so that the circuit diagram in FIG. 3 may become equivalent to the circuit diagram in FIG. 5. That is, in the method according to an embodiment of the present inventive concept, when an instantaneous power failure of a AC power source 10 occurs, the connection between the first and second capacitors 111 and 112 may be changed into a serial connection (see FIG. 5) so that the voltage between both terminals of the serially connected capacitors can be instantaneously increased, thereby increasing the hold-up time.

Figure 6:
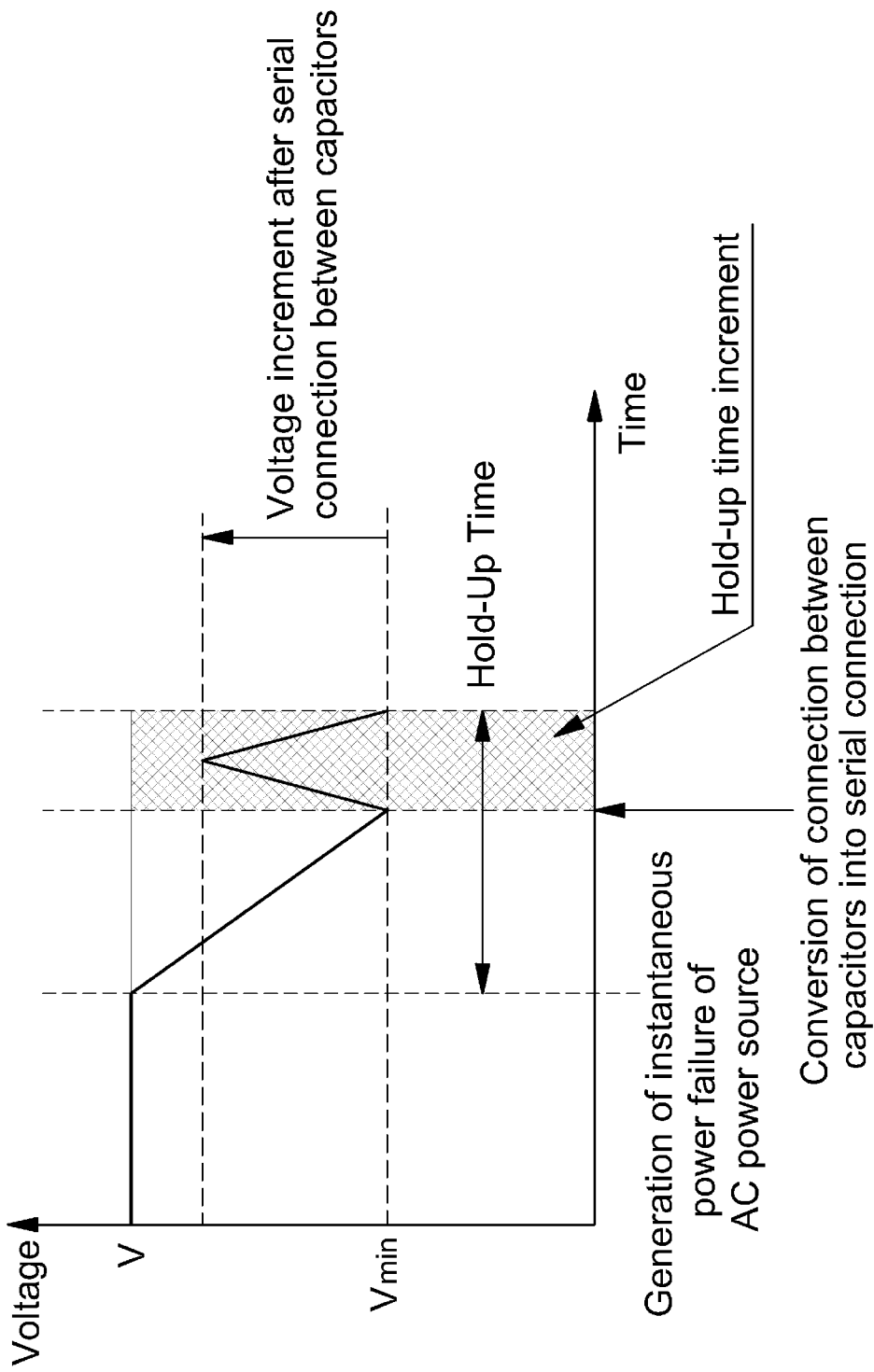
FIG. 6 is a graph illustrating changes in voltage, caused by the serial connection of the output capacitor, in a method for changing the capacitance value of the output capacitor of the PFC according to an embodiment of the present inventive concept.

FIG. 6 is a graph illustrating changes in voltage, caused by the serial connection of the output capacitor, in the method for changing the capacitance value of the output capacitor of the PFC according to an embodiment of the present inventive concept.

As shown in FIG. 6, when an instantaneous power failure occurs such that the input of the AC power source is cut off from the onboard battery charger, the voltage of the output capacitor may gradually decrease from 'V'. However, in the course of dropping the voltage, when the connection between the first and second capacitors 111 and 112 is changed into a serial connection, the capacitance values of the capacitors may be decreased, and therefore, the voltage of the output terminal of the capacitor may be increased. Thus, it is possible to extend the hold-up time of the onboard battery charger.

This process will be described in detail as follows.

The hold-up time of the onboard battery charger may be explained by the following equation.

$$\frac{1}{2}C(V^2 - V_{min}^2) = (\text{Power}_{out}) \times (\text{Hold-Up Time}) \qquad \text{Equation 1}$$

In Equation 1, the left side denotes energy stored in the capacitor, 'V' denotes a voltage applied to the capacitor, and '$V_{min}$' denotes a minimum voltage level for a continuous output of the onboard battery charger.

In Equation 1, the value of 'C' or the value of 'V' is increased in order to improve the hold-up time.

Thus, in the method according to an embodiment of the present inventive concept, when an instantaneous power failure occurs, the connection between the first and second capacitors 111 and 112 may be changed into a serial connection so that the voltage between both of the terminals of the capacitor can be increased, thereby improving the hold-up time.

The inventive concept has been described in detail with reference to exemplary embodiments thereof. However, it will be appreciated by those skilled in the art that changes may be made in these embodiments without departing from the principles and spirit of the inventive concept, the scope of which is defined in the appended claims and their equivalents.

What is claimed is:

1. A circuit for changing a capacitance value of an output capacitor of a power factor corrector (PFC), the circuit comprising:
   a first capacitor provided at an output terminal of the PFC and having a first terminal and a second terminal;
   a second capacitor having a first terminal and a second terminal;
   a first switch having one terminal connected to the first terminal of the first capacitor and another terminal connected to the first terminal of the second capacitor;
   a second switch having one terminal connected to the first terminal of the first capacitor and another terminal connected to the second terminal of the second capacitor; and
   a third switch having one terminal connected to the second terminal of the second capacitor and another terminal connected to the second terminal of the first capacitor.

2. The circuit of claim 1, further comprising:
   an instantaneous power failure sensor configured to sense whether an instantaneous power failure occurs in AC power applied to the PFC; and a controller configured to control open and close operations of the first, second, or third switch based on a result of the sensing whether the instantaneous power failure occurs in the AC power, by the instantaneous power failure sensor.

3. The circuit of claim 2, wherein, when the instantaneous power failure sensor senses that the instantaneous power failure does not occur in the AC power, the controller is configured to close the first switch, open the second switch, and close the third switch.

4. The circuit of claim 2, wherein, when the instantaneous power failure sensor senses that the instantaneous power failure occurs in the AC power, the controller is configured to open the first switch, close the second switch, and open the third switch.

* * * * *